(No Model.)

S. A. VAN BUSKIRK & W. P. WILSON.
COFFEE OR TEA POT.

No. 494,607. Patented Apr. 4, 1893.

Witnesses:

Inventors
Samuel A. Van Buskirk
William P. Wilson
By James J. Sheehy
Attorney

UNITED STATES PATENT OFFICE.

SAMUEL A. VAN BUSKIRK AND WILLIAM P. WILSON, OF CAÑON CITY, COLORADO.

COFFEE OR TEA POT.

SPECIFICATION forming part of Letters Patent No. 494,607, dated April 4, 1893.

Application filed December 10, 1892. Serial No. 454,711. (No model.)

*To all whom it may concern:*

Be it known that we, SAMUEL A. VAN BUSKIRK and WILLIAM P. WILSON, citizens of the United States, residing at Cañon City, in the county of Fremont and State of Colorado, have invented certain new and useful Improvements in Coffee or Tea Pots; and we do declare the following to be a full, clear, and exact description of the invention, such as will enable others skilled in the art to which it appertains to make and use the same.

Our invention has relation to improvements in coffee or tea pots, and it has for its general object to provide a pot embodying such a construction that an escape of steam during the process of making the coffee or tea will be effectually prevented, and all of the aroma contained in the coffee or tea will be consequently retained in the beverage.

Figure 1:
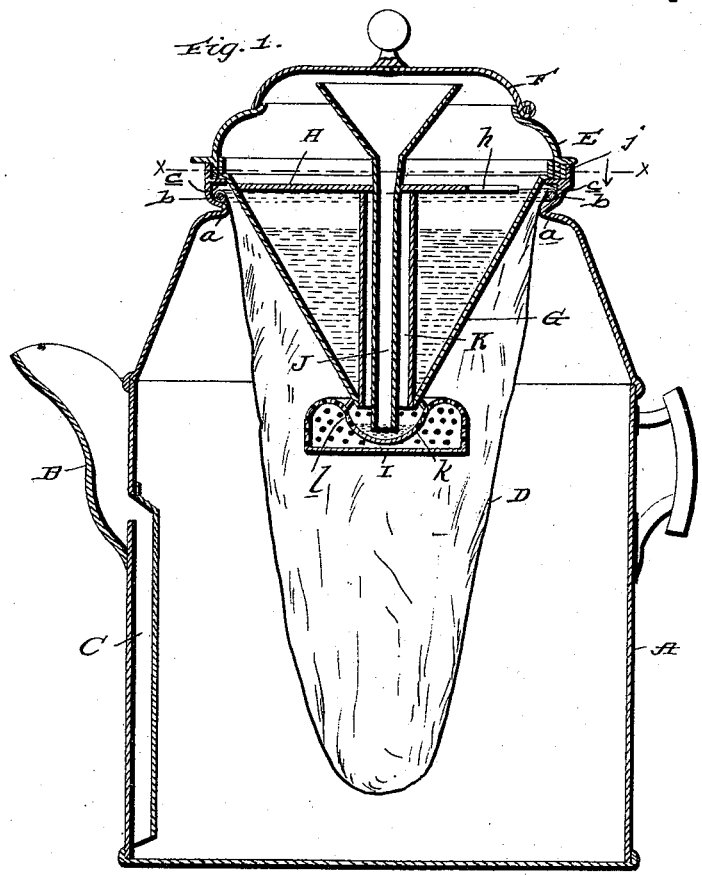
Figure 2:
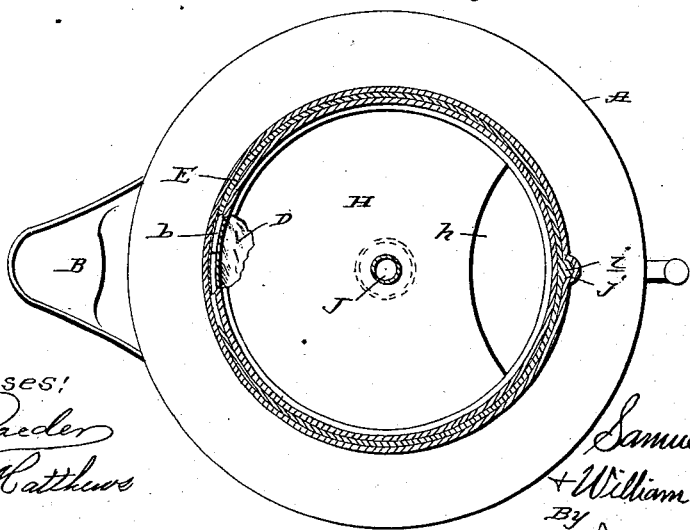

Other objects and advantages will be fully understood from the following description and claims when taken in connection with the annexed drawings in which:

Figure 1, is a vertical, diametrical section of a pot embodying our invention, and Fig. 2, is a horizontal section of the same taken in the plane indicated by the line $x$, $x$, of Fig. 1, looking downwardly.

Referring by letter to the said drawings: A, indicates the body of our improved pot, which is preferably of a general cylindrical form, and B, indicates the spout of the same which is connected to the outside of the body in any approved manner. This spout B, as better shown in Fig. 1, is connected with the interior of the body A, by a conduit C, which is preferably arranged upon the inner side of the body, and extends to a point adjacent to the bottom of the same, whereby it will be seen that when a small quantity of liquid is contained in the pot, the lower end of the conduit will be sealed and an escape of steam through the same prevented.

The body A, which preferably has its upper portion reduced in diameter, as shown, is provided adjacent to its upper end with a ledge a, preferably formed by indenting the body, which ledge is designed to support the ring b, of the bag D, which is suspended in the pot and is designed to receive the coffee or tea from which the beverage is to be made, as will be presently described. As better illustrated in Fig. 2, of the drawings the ring b, which is preferably formed from wire, is broken, so that the looped edge of the bag may be readily gathered upon the same and so that the ring may be readily disconnected from the bag and employed in conjunction with a new bag when desired.

E, indicates the removable cover of our improved pot which is supported by a ledge or shelf c, and is provided with a hinged cap F, as shown; and G, indicates the condensing cup which is designed to contain cold water to condense the steam as it rises in the pot, as will be hereinafter explained. This cup G, which is supported by the shelf c, of the body A, and rests within the upper portion of the bag D, as illustrated, is of a general inverted cone shape, as shown, whereby it will be seen that the water of condensation collecting upon the same will be quickly run to its lower end and will drip back into the body of the pot. By reason of the condensing cup G, being of the form described, it will be further perceived that a large condensing surface will be presented to the steam, and the formation of the water of condensation will thereby be greatly facilitated. Arranged at about the point illustrated, in the condensing cup G, is a plate H, which is designed and adapted to prevent the water in said cup from spilling when the pot is tilted or inclined, to pour its contents. This plate H, is provided at or adjacent to its edge with an opening h, through which water may be poured into the cup.

In order to enable the operator to properly place the condensing cup G, in the body A, so that the opening b, of the plate H, will rest adjacent to the rear side of the pot, as illustrated, we design providing the cup with a lug as i, which is designed to take into a corresponding indenture j, formed in the body A, as better illustrated in Fig. 2, of the drawings.

Suitably connected to the lower end of the condensing cup G, is a pan or receptacle I, which is designed to receive hot water and spray the same over the coffee or tea in the bag D. This receptacle or pan I, as better shown in Fig. 1, of the drawings, preferably comprises a closed bottom wall k, and a foraminated side wall l, which is curved inwardly above the wall $k$, as illustrated. By reason of the bottom wall $k$, of the pan or receptacle I, being closed as just described, it will be seen that the passage of the hot water through the pan or receptacle will be retarded, whereby the water will form a seat to prevent the steam from entering the lower end of the hot water feed tube J. This feed tube J, which is preferably provided with a flaring mouth as shown, extends down through the comparatively large central tube K, with which the condensing cup G, is provided, to a point within the pan or receptacle I, for the purpose before stated. By the provision of the large tube K, in the condensing cup G, it will be readily perceived that an air space will be formed around the feed tube J, whereby the hot water passing through said tube will be prevented from heating the water in the condensing cup.

In the practice of our invention, the coffee or tea from which the beverage is to be made, is placed in the bag D, and the condensing cup G, is then filled with cold water and is placed in position within the pot as described. The hot water is then poured into the upper end of the tube I, through the opening in the cover E, and the cap F, is then closed and the contents of the pot allowed to stand a few minutes before use.

It will be seen from the foregoing description taken in connection with the drawings that we have provided a cheap and simple pot adapted to make excellent quality of coffee or tea; and inasmuch as the bag D, and the cup G, are removable it will be further seen that our improved pot may be cleaned as readily as the ordinary pot, which is highly desirable.

It is obvious to those skilled in the art that certain changes or modifications may be made in the construction of our improved pot without departing from the scope of our invention, and we therefore do not wish to be understood as confining ourselves to the construction herein illustrated and described.

Having described our invention, what we claim is—

1. In a coffee or tea pot, substantially as described, the combination with the body, of a condensing cup arranged in said body, the pan or receptacle connected to the condensing cup and comprising a closed bottom wall and a foraminated side wall, and the hot water feed tube extending into the pan or receptacle, substantially as and for the purpose set forth.

2. In a coffee or tea pot, substantially as described, the combination with the body, of the condensing cup arranged in said body and having the central, vertical tube K, and a hot water feed tube extending down through the tube K, of the condensing cup, substantially as and for the purpose set forth.

3. In a coffee or tea pot, substantially as described, the combination of the body, the bag suspended in the body, the condensing cup, the pan or receptacle connected to the condensing cup and comprising the closed bottom wall and the foraminated side wall, and the hot water feed tube extending down through the condensing cup to a point within the pan or receptacle, substantially as specified.

4. In a coffee or tea pot, substantially as described, the combination with the body having the indenture $j$, of the condensing cup having the lug $i$, adapted to engage the indenture of the body, and the plate H, arranged in the condensing cup and having the aperture $h$, all substantially as and for the purpose described.

5. The combination with a coffee pot, of a pervious coffee holder adapted to be suspended therein, a cold water chamber interior to said holder a sprayer also within the holder and adapted to receive hot water, and a hot water feed tube extending down through the cold water chamber to a point within the sprayer substantially as specified.

In testimony whereof we affix our signatures in presence of two witnesses.

SAMUEL A. VAN BUSKIRK.
WILLIAM P. WILSON.

Witnesses as to the signature of Samuel A. Van Buskirk:
JOHN W. COCHRAN,
J. R. KENNON.

Witnesses as to the signature of William P. Wilson:
JAMES A. JONES,
HARLEY J. INGERSOLL.